United States Patent [19]

Schneider

[11] Patent Number: 5,892,801
[45] Date of Patent: Apr. 6, 1999

[54] DECISION PATH REDUCTION OF M-ARY TREE-SEARCH DETECTOR

[75] Inventor: Kevin W. Schneider, Huntsville, Ala.

[73] Assignee: Adtran, Inc., Huntsville, Ala.

[21] Appl. No.: 810,586

[22] Filed: Mar. 4, 1997

Related U.S. Application Data

[60] Provisional application No. 60/012,771 Mar. 4, 1996.
[51] Int. Cl.$^6$ .............................. H04L 1/00; H04L 25/08
[52] U.S. Cl. ............................................ 375/348; 375/341
[58] Field of Search ...................... 375/348, 346, 375/341, 362, 366, 229

[56] References Cited

U.S. PATENT DOCUMENTS

| 4,027,257 | 5/1977 | Perreault | 333/18 |
|---|---|---|---|
| 4,096,442 | 6/1978 | McRae et al. | 329/112 |
| 4,646,173 | 2/1987 | Kammeyer et al. | 360/51 |
| 4,847,871 | 7/1989 | Matsushita et al. | 375/94 |
| 5,031,195 | 7/1991 | Chevillat et al. | 375/14 |
| 5,081,651 | 1/1992 | Kubo | 375/94 |
| 5,285,480 | 2/1994 | Chennakeshu et al. | 375/101 |
| 5,371,471 | 12/1994 | Chennakeshu et al. | 329/304 |
| 5,774,505 | 6/1998 | Baugh | 375/348 |

*Primary Examiner*—Stephen Chin
*Assistant Examiner*—Mohammad Ghayour
*Attorney, Agent, or Firm*—Charles E. Wands

[57] ABSTRACT

A limited search variant of the fixed delay tree search detector is used to recover digital signals corrupted with intersymbol interference and additive noise. The limited search algorithm uses a variant of an equalizer decision device—a simple slicer—to reduce the number of paths that are considered by the tree search detector from $M^{D+1}$ to either $D+1$ or $2^{D+1}$ paths, thereby significantly reducing the complexity of the tree-search detector. This limited search detector enjoys negligible loss in performance, compared with that of a full fixed delay tree search.

14 Claims, 4 Drawing Sheets

DECISION PATH REDUCTION OF M-ARY TREE-SEARCH DETECTOR

CROSS-REFERENCE TO RELATED APPLICATIONS

The present invention claims the benefit of previously filed co-pending Provisional Patent Application, Ser. No. 60/012,771, filed Mar. 4, 1996.

FIELD OF THE INVENTION

The present invention relates in general to communication systems, and is particularly directed to a mechanism for deriving estimates of M-ary digital communication signals, where M is greater than two, that have been transported over a time-dispersive channel, by means of a reduced complexity M-ary decision tree, having a look-ahead depth of D symbols and M branches, in which the number of decision paths of the tree is reduced from $M^{D+1}$ to $D+1$ or $2^{D+1}$.

BACKGROUND OF THE INVENTION

Intersymbol interference (ISI) is often a major factor which limits performance of digital communication systems employed to transmit digital data over a time-dispersive channel, such as a telephone line. Over the past few decades, a number of signal processing techniques have been developed for use in receivers for channels subject to ISI. These techniques include the use of linear equalization, a decision feedback equalizer (DFE), and maximum likelihood sequence estimation (MSLE). Both linear and decision feedback equalization are oriented toward simplicity and low complexity, sacrificing performance. On the other hand, an MLSE, such as that described in an article by G. D. Forney, entitled: "Maximum-Likelihood Sequence Estimation of Digital Sequences in the Presence of Intersymbol Interference," IEEE Transactions on Information Theory, Vol. IT-18, No. 3, May 1972, pp. 363–378, and a maximum a priori (MAP) symbol-by-symbol estimator, as described in an article by K. Abend et al "Statistical Detection for Communication Channels with Intersymbol Interference," Proceedings of the IEEE, Vol. 58, No. 5, May 1970, pp. 779–785, and in an article by J. F. Hayes et al, entitled: "Optimal Sequence Detection and Optimal Symbol-by-Symbol Detection: Similar Algorithms," IEEE Transactions on Information Theory, Vol. IT-18, No. 3, May, 1972, pp. 363–378, seek optimum or near optimum performance, but do so at a cost of substantially increased computational and data storage requirements.

More recently, symbol detection schemes have been developed that approach the performance of these optimal techniques, but at a much lower complexity. These techniques include the reduced state sequence estimator (RSSE), as described in an article by A. Duel-Hallen et al, entitled: "Delayed Decision-Feedback Sequence Estimation," IEEE Transactions on Communications," Vol. 37, May 1989, pp. 428–436, and in an article by M. V. Eyuboglu et al, entitled: "Reduced-State Sequence Estimation with Set Partitioning and Decision Feedback," IEEE Transactions on Communications," Vol. 36, January 1988, pp. 13–20, and the fixed delay tree search (FDTS) mechanism, as described in an article by A. P. Clark et al, entitled: "Developments of the Conventional Nonlinear Equalizer," IEE Proceedings, Vol. 129, Pt. F, No. 2, April 1982, pp. 85–94, articles by J. Moon et al, entitled: "Efficient Sequence Detection for Intersymbol Interference Channels with Run-Length Constraints," IEEE Transactions on Communications, Vol. 42, No. 9, September, 1994, pp. 2654–2660, and "Performance Comparison of Detection Methods in Magnetic Recording," IEEE Transactions on Magnetics, Vol. 26, No. 6, November 1990, pp. 3155–3172, an article by J. G. Proakis et al, entitled: "A Decision-Feedback Tree-Search Algorithm for Digital Communication through Channels with Intersymbol Interference," 1986 ICC Conference Proceedings, pp. 657–661, and an article by D. Williamson et al, entitled: "Block Decision Feedback Equalization," IEEE Transactions on communications, Vol. 40, No. 2, February 1992, pp. 255–264.

The RSSE is a simplification of the MLSE, which reduces complexity by limiting the dimensionality of the trellis. The FDTS scheme is a simplification of the MAP symbol-by-symbol detector, using decision feedback to limit complexity. (In the present description, it is to be understood that the term FDTS applies to general techniques used in a variety of sources under various names, and is not necessarily limited to the specific FDTS/DF proposed in the above-referenced Moon et al article for a magnetic recording channel.) Both of these reduced complexity techniques (RSSE and FDTS) decrease complexity by considering only a portion of channel ISI in the enhanced decision techniques, and using low complexity linear or decision feedback equalization to handle the remaining portion of the ISI.

For the case of pulse amplitude modulation (PAM) communication signals, such as 2B1Q modulation used in high speed data service loop (HDSL) signals, as a non-limiting example, such a dispersive channel may be diagrammatically illustrated in FIG. 1, as a discrete finite impulse response (FIR) additive white Gaussian noise (AWGN) channel model applied to a continuous time linear system with correlated noise by using the whitened matched filter described in the above-referenced Forney article.

In accordance with this discrete model, a sequence of symbols $[u_i]$ chosen from an M-ary alphabet $A=\{-M+1, -M+3, \ldots, M-3, M-1\}$ is transmitted. The transport of the input sequence $[u_i]$ through the channel $h_k$, shown at 10 results in the output sequence $\{y_i\}$, given by $$y_i = \sum_{k=0}^{N} u_{i-k} h_k + w_i = s_i + w_i \tag{1}$$

where $\{h_k=0, 1, \ldots, N\}$ is the FIR channel response, and $\{W_i\}$ is a sequence of noise samples, injected or summed at 12, which is white and Gaussian, with a zero mean and a variance $\sigma^2$.

At the receive end of the channel, the combined noise plus information signal $w_i + s_i = y_i$ is processed by means of a signal processor 14 to produce an output signal sequence $\hat{u}_{i-D}$, representative of what symbols were actually transmitted. As described in the second of the above-referenced Moon et al articles, the FDTS scheme can be viewed as a depth-limited tree-search. It can also be viewed as a limited trellis search, or a multi-dimensional decision space, as described in the Williamson et al article.

FIG. 2 diagrammatically illustrates an M-ary search tree, for the case of 2B1Q signals, as an example, in which the tree has M=4 branches emanating from each node, to represent four possible 2B1Q symbols (-3, -1, +1, +3) at each symbol time. A sequence of input symbols will result in a path through the search tree. Although the search tree may grow exponentially without bound, the FDTS technique limits the size of the tree by making a decision at time i, thus eliminating all paths that do not contain the chosen symbol at that time.

The FDTS mechanism makes a decision at time i by looking ahead D levels in the tree and computing a cumulative error metric for each of the possible paths through the tree, namely $M^{D+1}$ paths, each with D+1 branches. The error metric is a function of both the received data, $[y_i, y_{i+1}, \ldots, y_{i+D}]$, and the symbols associated with the decision path. The decision is the symbol associated with the first branch of the path which has the smallest error metric. Feedback of past decisions $\{\hat{u}_m, i-N \leq m < i\}$ is used to keep the root node of the tree aligned with the decision time i.

The input symbol associated with a branch at time i is denoted by $x_i$, where $x_i \in A$. Each path of look-ahead depth j is denoted by the vector of the input symbols associated with each branch in the path: $X_{i,j}=[x_i, x_{i+1}, \ldots, x_{i+j}]$. Each path has associated with it an output symbol, $v_{i,j}(X_{i,j})$, and a last branch error metric, $e_{i,j}(X_{i,j})$. The input to the FDTS is a vector of partially decision-feedback-equalized received signals.

The D+1 components of the input vector $Z^i$ are computed using $$z_{i,j} = y_{i+j} - \sum_{k=j+1}^{N} \hat{u}_{i+j-k} h_k \qquad (2)$$

for j=0, 1, . . . , D.

Rewriting equation (2) in recursive form as equations (3) and (4) below reveals that the summation represents decision feedback. Namely, $$z_{i,D} = y_{i+D} - \sum_{k=D+1}^{N} \hat{u}_{i+D-k} h_k \qquad (3)$$

and $$Z_{i+1,j-1} = Z_{i,j} - \hat{u}_i h_j, j=1,2, \ldots, D \qquad (4)$$

Equation (3) represents partial decision feedback equalization, where the first D taps of the feedback filter are set to 0, allowing the decision algorithm to make use of the remaining ISI. Equation (4) updates each vector component as a new decision is made and a new sample $y_{i+D}$ is received.

The decision $\hat{u}_i$ is formed by searching all $M^{D+1}$ tree paths, $X_{i,D}=[x_i, x_{i+1}, \ldots, x_{i+D}]$, and selecting that path $\hat{U}_{i+D}$, which minimizes the cumulative error metric:

$$E^2(X_{i,D}) = \sum_{j=0}^{D} (z_{i,j} - v_{i,j}(X_{i,j}))^2 = \sum_{j=0}^{D} e^2_{i,j}(x_{i,j}) \qquad (5)$$

$$\text{where } v_{i,j}(X_{i,j}) = \sum_{k=0}^{j} = x_{i+j-k} h_k, j = 1, 2, \ldots, D \qquad (6)$$

is the ideal noise free (partially decision-feedback-equalized) output signal, and $e_{i,j}(X_{i,j})$ is the branch error, for the last branch in the path of look-ahead depth j.

The decision $\hat{u}_i$ is that symbol associated with the first branch of the path selected:

$$\hat{u}_i = \left[ arg \min_{x_{i,D} \in A^{D+1}} [E^2(X_{i,D})] \right] * \begin{bmatrix} 1 \\ 0 \\ \vdots \\ 0 \end{bmatrix} \qquad (7)$$

where the column vector on the right side of equation (7) selects the first component of the path vector.

In the first of the above-referenced articles by J. Moon et al, and the article by Williamson et al, it is shown that, in the absence of past decision errors, this decision metric is asymptotically equivalent to the MAP estimate for the transmitted symbol $u_i$, given delay D and high-SNR.

Because the conventional FDTS scheme takes into consideration each of the possible $M^{D+1}$ paths through the tree, it is both computationally complex and has very substantial data storage requirements.

SUMMARY OF THE INVENTION

In accordance with the present invention, the processing complexity and memory requirements of a conventional search tree for M-ary signalling are reduced by limiting the number of paths through a tree search having a look-ahead depth of D symbols. Pursuant to a first embodiment of the invention, low-complexity, single dimension detectors are employed to reduce the FDTS tree having $M^{D+1}$ paths to a search tree having only D+1 paths, beginning with the input node of the original FDTS as a first node and continuing through D successive nodes of the tree. According to a second embodiment of the invention, the FDTS tree is reduced to a search tree having $2^{D+1}$ paths. Advantageously, the performance of the reduced M-ary search tree signal processing mechanism of the present invention has been shown to be only slightly less than and is virtually indistinguishable from that of a conventional FDTS scheme under high signal to noise ratio conditions.

In the first embodiment of the invention, the error metric of a received symbol value is determined for each of the M branches extending from a jth node, where j has a value from 0 to D, and a smallest error metric node is defined as that (j+1)th node to which a smallest error metric branch from the jth node extends. A first smallest error metric path is identified as that path which passes through each of the jth nodes. For each of the jth smallest error metric nodes along path, a kth next smallest error metric node is defined as that kth node to which a next smallest error metric branch from a respective jth node extends, where k has a value from j+1 to D.

For each of these kth next smallest error metric nodes, an error metric of a received symbol value is determined for each of M branches extending therefrom, and an lth auxiliary smallest error metric node, where l has a value from k+1 to D+1, is identified as that node to which an auxiliary smallest error metric branch from a respective kth node extends. These auxiliary nodes are used to identify D additional paths, each of which contains a next smallest error metric branch to a kth node from each of the jth nodes of the primary path and auxiliary smallest error metric branches extending from the kth nodes through successive lth nodes.

The second embodiment of the invention, in which the FDTS is reduced to a search tree having $2^{D+1}$ paths, is similar to the first embodiment, in that it determines an error metric of a received symbol value for each of M branches, extending from a jth node, where j has a value from 0 to D, starting with the input node as a first node and continuing through successive nodes. A smallest error metric is defined as that (j+1) th node to which a smallest error metric branch from the jth node extends. Also, a kth next smallest error metric node, where k has a value from j+1 to D, is defined as that kth node to which a next smallest error metric branch from a respective jth node extends. Likewise, for a kth node, respective smallest and next smallest error metrics are defined. Thus each jth or kth node of the $2^{D+1}$ path tree of the second embodiment has a pair of decision paths, one of which is associated with the smallest error metric, and the other of which is associated with the next smallest error metric.

DETAILED DESCRIPTION

Figure 1:
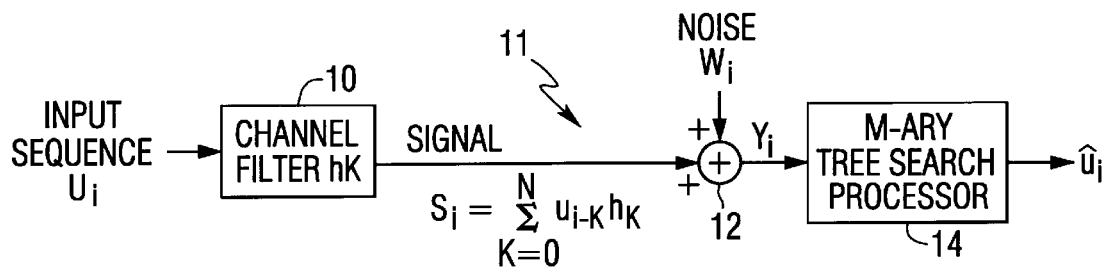
FIG. 1 diagrammatically illustrates a dispersive channel for transporting pulse amplitude modulation (PAM) communication signals.

Before describing in detail the improved reduced complexity M-ary decision tree search scheme in accordance with the present invention, it should be observed that the present invention resides primarily in what is effectively a prescribed signal processing mechanism that is embedded in the signal processing receiver of an M-ary communication system, in which M-ary communication signals (where M is greater than two) have been transmitted over a channel, such as a telephone link, as a non-limiting example, which subjects the signals to ISI. Such a signal processing mechanism may be implemented, for example, in software that is executed by the signal processing receiver's control processor, a separate general purpose computer, or in a custom hardware configured digital signal processor (DSP). The particular implementation chosen is a matter of user choice and does not affect the utility of the invention.

Consequently, the manner in which the present invention interfaces with the signal flow path in the receiver has been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

As noted briefly above, the processing complexity and memory requirements of a conventional search tree for M-ary signalling is reduced by limiting the number of paths through a tree search having a look-ahead depth of D symbols. In a first embodiment of the invention, diagrammatically illustrated in FIG. 4, low-complexity, single dimension detectors are employed to reduce the FDTS tree having $M^{D+1}$ paths to a search tree having only D+1 paths. In a second embodiment of the invention, diagrammatically illustrated in FIG. 7, the FDTS tree is reduced to a search tree having $2^{D+1}$ paths. Advantageously, the performance of the reduced M-ary search tree signal processing mechanism of the present invention has been shown to be only slightly less than and is virtually indistinguishable from that of a conventional FDTS scheme under high signal to noise ratio (SNR) conditions.

Figure 2:
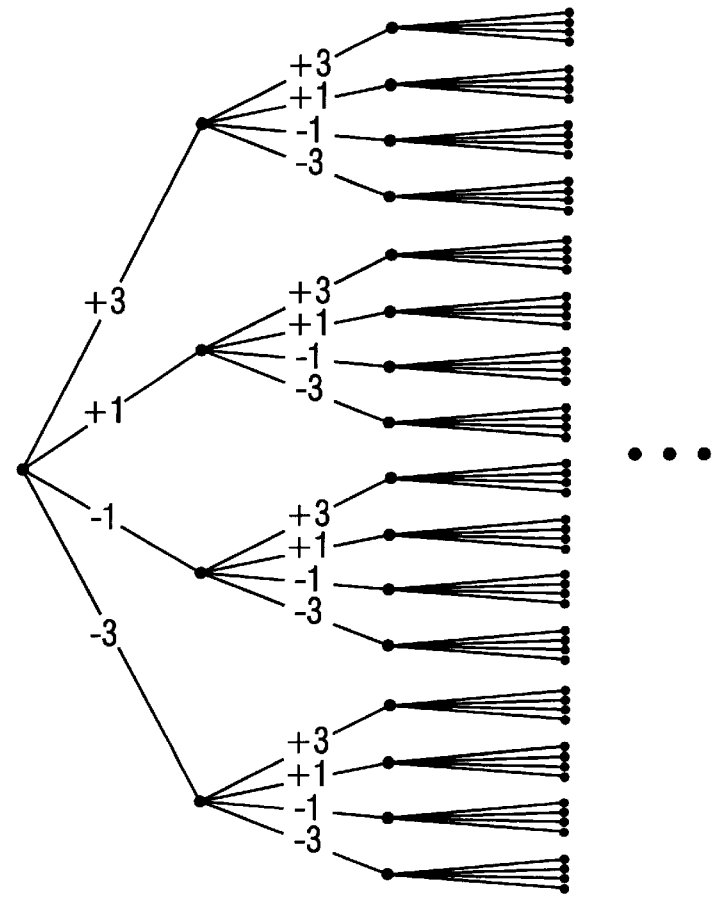
FIG. 2 diagrammatically illustrates an M-ary search tree for the case of four level 2B1Q signals.

To facilitate an understanding of the present invention, it is initially useful to consider the formation of a slightly modified version of a conventional decision feedback equalizer (DFE), such as the tree for M=4 signalling shown in FIG. 2 for HDSL signalling, for the purpose of placing the DFE within the FDTS framework described above. This is readily accomplished by setting the look-ahead depth D of the standard FDTS to zero, which means that only a single node and set of branches need be considered. In this case, the input to the tree search is $z_{i,0}$, and the path chosen—the one which minimizes equation (5)—now has only a single branch. Thus, the decision process is equivalent to choosing that branch which minimizes a single squared branch error, $e^2_{i,0}(X_{i,0})$. This is the equivalent to using a simple M-ary decision device, commonly referred to as a slicer. The slicer makes an estimate of the transmitted symbol, the decision $\hat{u}_i$, at each node of the tree by choosing the branch with the minimum error:

$$\hat{u}_i = arg(\min_{x_i \in A} [e^2_{i,0}(X_{i,0})]) \qquad (8)$$

For sake of illustration only, consider a slightly modified DFE, looking ahead in the tree D symbol times. Since the current process seeks seeking to duplicate the performance of a DFE, the search is limited through the D+1 tree levels to the path picked by the DFE. This path is selected by starting with a depth of zero and extending the path at each depth by selecting the branch with the minimum squared branch error, just as in equation (7). At each depth, only one of the M branches is selected by using the very simple technique of slicing, which results in a single path through the tree where the error has been minimized on a branch by branch basis.

For this purpose, a tentative partial path decision is defined as $\hat{U}^0_{i,j} = [\hat{u}^0_{i,0}, \hat{u}^0_{i,1}, \hat{u}^0_{i,2}, \hat{u}^0_{i,3}, \ldots, \hat{u}^0_{i,j}]$ for each look-ahead depth in the tree, j=0, 1, ..., D, and a decision is made for the partial path at depth j conditioned on the partial path decision made at depth j−1. (It should be noted that, in this representation, the superscript has no-meaning, but is reserved for future use).

Thus, the search is limited to only those paths at stage j which emanate from the node selected at stage j−1. This operation may be denoted as:

$$\hat{U}^0_{i,j} = arg(\min_{X_{i+j} \in A} [E^2(X_{i,j} = [\hat{U}_{i,j-1}, x_{i+j}])]) \qquad (9)$$

where j=0,1,2, ..., D and $\hat{U}^0_{i,-1}$ is defined as the empty set.

Figure 3:
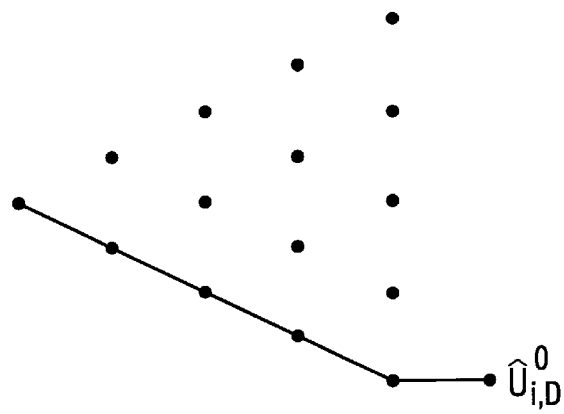
FIG. 3 shows a reduction of an M-ary search tree to a single path that passes only through each node having the smallest branch error.

In this "look ahead" DFE, once the path through the tree has been selected, the final decision $\hat{u}_i$ becomes:

$$\hat{u}_i = \hat{U}^0{}_{i,D} * \begin{bmatrix} 1 \\ 0 \\ \cdot \\ \cdot \\ \cdot \\ 0 \end{bmatrix} \quad (10)$$

by selecting the first branch of the path as the decision. The resulting search path is shown in FIG. 3.

Figure 4:
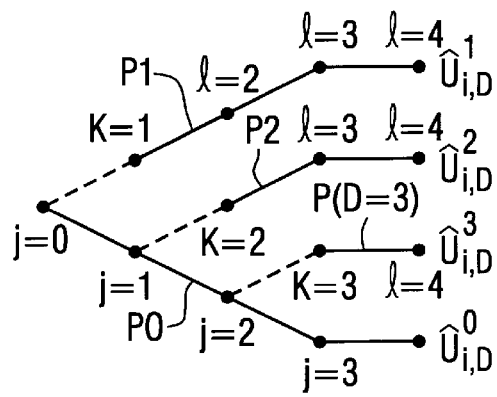
FIG. 4 diagrammatically illustrates a reduced fixed delay search tree in accordance with a first embodiment of the invention, having D+1 tentative decision paths.

In accordance with the present invention, rather than limiting the search to only the path which passes through that branch at each node having the smallest branch error, those paths having the two smallest branch errors at each node contained in the DFE path as selected by equation (9) are retained, which results in a search tree having a configuration shown in FIG. 4.

Then, at depth j, the tentative partial paths may be denoted as:

$$\hat{U}^k{}_{i,j} = [\hat{u}^k{}_{i,0}, \hat{u}^k{}_{i,1}, \ldots, \hat{u}^k{}_{i,j}] \quad (11)$$

where k=0 or j+1.

These paths are extensions of the tentative partial path $\hat{U}^0{}_{i,j-1}$, which, as defined above, is the partial path chosen by the DFE at depth j-1. $\hat{U}^0{}_{i,j}$ is the extension to that path chosen by the DFE having the minimum squared branch error, and $\hat{U}^{j+1}{}_{i,j}$ is the extended path with the next smallest squared branch error. After diverging from the DFE path, each of the non-DFE paths, $\hat{U}^k{}_{i,j}$, k>j, are extended to a depth of D by applying the DFE rule (selecting the branch with the minimum branch error) to the remaining levels.

In accordance with the current notation, this operation can be expressed as:

$$\hat{U}^k{}_{i,j} = arg(\min_{X_{i+j} \in A} [e^2_{i,j}(X_{i,j} = [\hat{U}^k{}_{i,j-1}, x_{i+j}])]) \quad (12)$$

where k=0,1,2, ..., j,j+2, ..., D, j=0,1,2, ..., D and $$\hat{U}^{j+1}{}_{i,j} = arg\left(\min_{\substack{X_{i+j} \in A \\ X_{i+j} \neq \hat{u}^0{}_{i,j}}} [e^2_{i,j}(X_{i,j} = [\hat{U}^0{}_{i,j-1}, x_{i+j}])]\right) \quad (13)$$

where j=0,1, ..., D-1

The reduced complexity tree search routine of FIG. 4, where the minimum error extension of equation (12) and the next smallest error extension of equation (13) at each level of the tree are shown, has D+1 paths.

Once the set of D+1 tentative decision paths has been selected, $\{\hat{U}_{ki,D}, k=0,1,2, \ldots, D\}$, equation (5) is employed to determine which path has the smallest cumulative squared branch error, and the first symbol of that path is selected as the final decision $\hat{u}_i$. Namely:

$$\hat{u}_i = \left[arg\left(\min_{k=0,1,\ldots,D} [E^2(\hat{U}^k{}_{i,D})]\right)\right] * \begin{bmatrix} 1 \\ 0 \\ \cdot \\ \cdot \\ \cdot \\ 0 \end{bmatrix} \quad (14)$$

Thus, in accordance with the first embodiment of the invention, in which an original M-ary FDTS tree having $M^{D+1}$ paths is reduced to one having only D+1 paths, beginning with the input node of the original FDTS as a first node and continuing through D successive nodes of the tree, the error metric of a received symbol value is determined for each of the M branches extending from a jth node, where j has a value from 0 to D, and a smallest error metric node is defined as that (j+1) th node to which a smallest error metric branch from the jth node extends. As shown in FIG. 4, a first smallest error metric path P0 is identified as that path which passes through each of the jth nodes.

For each of the jth smallest error metric nodes along path P0, a kth next smallest error metric node is defined as that kth node to which a next smallest error metric branch from a respective jth node extends, where k has a value from j+1 to D. For each of these kth smallest error metric nodes, an error metric of a received symbol value is determined for each of M branches extending therefrom, and an lth auxiliary smallest error metric node, where 1 has a value from k+1 to D+1, is identified as that node to which an auxiliary smallest error metric branch from a respective kth node extends.

As shown in FIG. 4, these auxiliary nodes are used to identify D additional paths P1–PD, each of which contains a next smallest error metric branch to a kth node from each of the jth nodes of the primary path and auxiliary smallest error metric branches extending from kth through successive lth nodes.

The overall configuration of the reduced size search tree of the first embodiment is thus formed of D+1 tentative decision paths that include the smallest error metric path P0 passing through each of the jth nodes, and D additional paths P1–PD, each of which contains a next smallest error metric branch to a kth node from each of the jth nodes of the primary path and auxiliary smallest error metric branches extending from the kth nodes through successive lth nodes.

From the foregoing description, it will be readily appreciated that the process according to the first embodiment of the invention is relatively simple, since the reduction in the size of the search tree from $M^{D+1}$ paths to D+1 paths using equations (12) and (13 involves only a series of one-dimensional decisions $\hat{u}$, similar to that of a DFE. Equation (12) is the "normal" slicer used in the DFE with set of thresholds $\{-M+2, -M+4, \ldots, M-2\}$, now operating on the term $z_{i,j} - v_{i,j}(\hat{U}^k{}_{i,j-1})$, while equation (13) employs a denser set of thresholds $\{-M+2, -M+3, -M+4, \ldots, M-2\}$, on $z_{i,j} - v_{i,j}(\hat{U}^0{}_{i,j-1})$. Since the set of thresholds used for equation (13) is a superset of the threshold set used for equation (12), they can be combined to form a "double slice" to obtain both the k=0 and k=j+1 extensions for the DFE path at each depth j<D.

As noted previously, the signal processor in which the reduced tree search reduction mechanism of the present invention is employed may be hardware or software resident. Moreover, the reduced tree search reduction routine itself can take on a variety of forms. For synchronous applications, iterative slicing can be executed for each decision interval, and sequential thresholding tests, similar to that described in an article by J. G. Kenney et al, entitled: "Geometric Representation of the Tree-Search Detector," 1992 ICC Conference Proceedings, pp. 0115–0119, can be used to select the minimum error path from the set of tentative decision paths without explicitly calculating the squared branch errors. This has the advantage of requiring few full fidelity multiplies, which the conventional DFE also avoids.

For asynchronous designs, it will be noted that if the final decision $\hat{u}_i = \hat{u}^{k+1}{}_{i,0} = \hat{u}^0{}_{i,0}$, that is, the final decision is the same as the DFE decision, then $\hat{U}^0{}_{i+1,D-1} = \hat{U}^0{}_{i,D}$ and $\hat{U}^k_{i+1,D-1} = \hat{U}^{k+1}_{i,D}$ (k>0), with the exception that $\hat{u}_i$ has now been removed from the path by decision feedback. Therefore, when the previous decision was the same as the DFE decision (which will be the case for the vast majority times at any useful SNR and error rate), the tentative decision paths can simply be extended, rather than re-calculating each path. When the final decision is not the DFE decision $\hat{u}_i = \hat{u}^1_{i,0}$, the "DFE" path of the new tree can be obtained by extending a path of the existing tree, $\hat{U}^0_{i+1,D-1} = \hat{U}^1_{i,D}$; however, the other paths $\hat{U}^{k>0}_{i+1,D}$ must be recalculated. The second embodiment avoids recalculation by keeping $2^{D+1}$ paths, as will be described.) Since the derivation of the above-described limited-search routine may appear somewhat to be an ad hoc process, it is useful to identify which paths are discarded, and to establish some conditions where the minimum distance path is guaranteed to be included in the set of tentative decision paths. At the outset, the effect of the "double slice" operation may be considered. Since the signals of interest are those subject to M-ary amplitude modulation, the decision points are each separated by a distance of $2h_0$. At a look-ahead depth of zero, a respective path of a DFE has a branch metric defined as:

$$e^2_{i,0}(\hat{U}^0_{i,0}) < h_0^2 \tag{15}$$

when $|z_{i,0}| < M \cdot h_0$.

The "neighbor" path has a branch metric defined as:

$$e^2_{i,0}(\hat{U}^1_{i,0}) = (2h_0 - |e_{i,0}(\hat{U}^0_{i,0})|)^2 \leq 4 \cdot h_0^2 \tag{16}$$

when $|z_{i,0}| < (M-1) \cdot h_0$.

All other branches must have a branch metric defined as:

$$e^2_{i,0}(X_{i,0}) \geq (2h_0 + |e_{i,0}(\hat{U}^0_{i,0})|)^2 \geq 4 \cdot h_0^2 \tag{17}$$

As a result, in the "interior" portion of the signal space $[(-M+1)h_0, (M-1)h_0]$, the "double-slice" is operative to reject all paths that include a first branch metric greater than $4h_0^2$.

This attribute of the "double-slice" process can be extended to the D+1 stage reduced search tree process of the present embodiment, with the following results. In the interior of the decision space (this is where $|x_{i+j} + e_{i,j}(X_{i,j})| < (M-1) \cdot h_0$ for all $j=0, 1, \ldots, D$ and all $x_{i+j} \in A$), all paths with a single branch metric larger than $4h_0^2$ are rejected, and only one of the D+1 branch metrics on the path can be larger than $h_0^2$ (since each path contains at most one "double slice" branch.) For D=1 and D=2, using geometric construction, similar to that derived in the above referenced Kenney et al article, it can be shown that the reduced tree search routine of the invention always includes the path with the minimum cumulative error metric, if $e^2_{i,j}(\hat{U}^0_{i,j}) < h_0^2$ for all $j: 0 < j \leq D$. It can also be shown that, in the absence of decision errors, even if the above condition is not met, the minimum distance path will be included with high probability.

Figure 6:
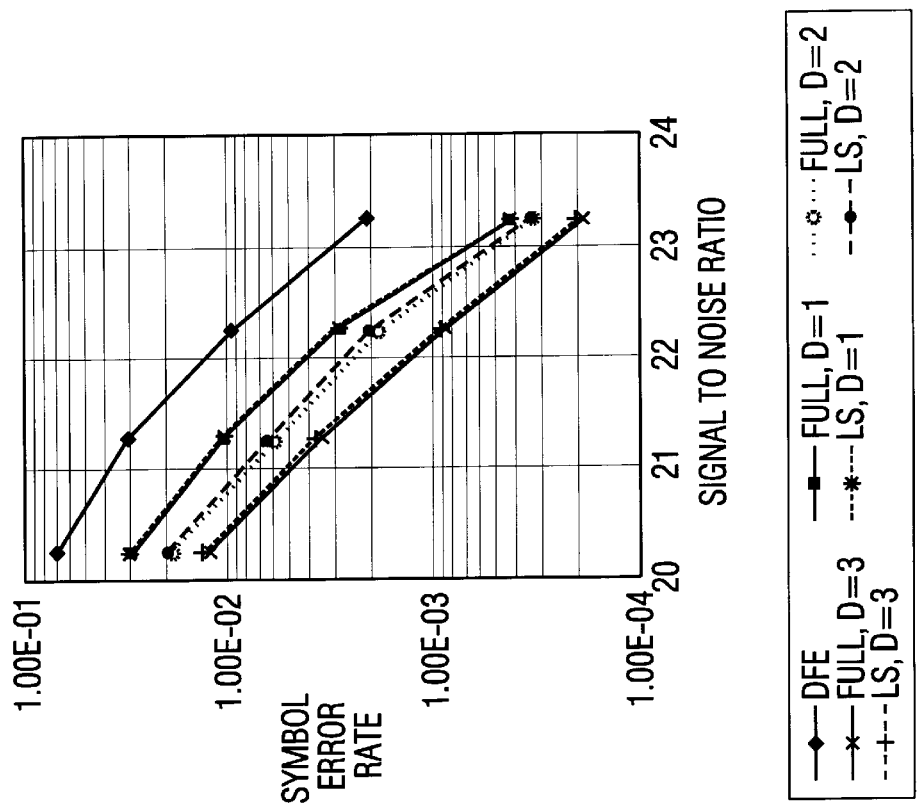
FIGS. 5 and 6 show the results of computer simulations for comparing the performance of the D+1 path search tree process according to the first embodiment of the invention on two of the channels described in the above-referenced Clark et al article.
Figure 5:
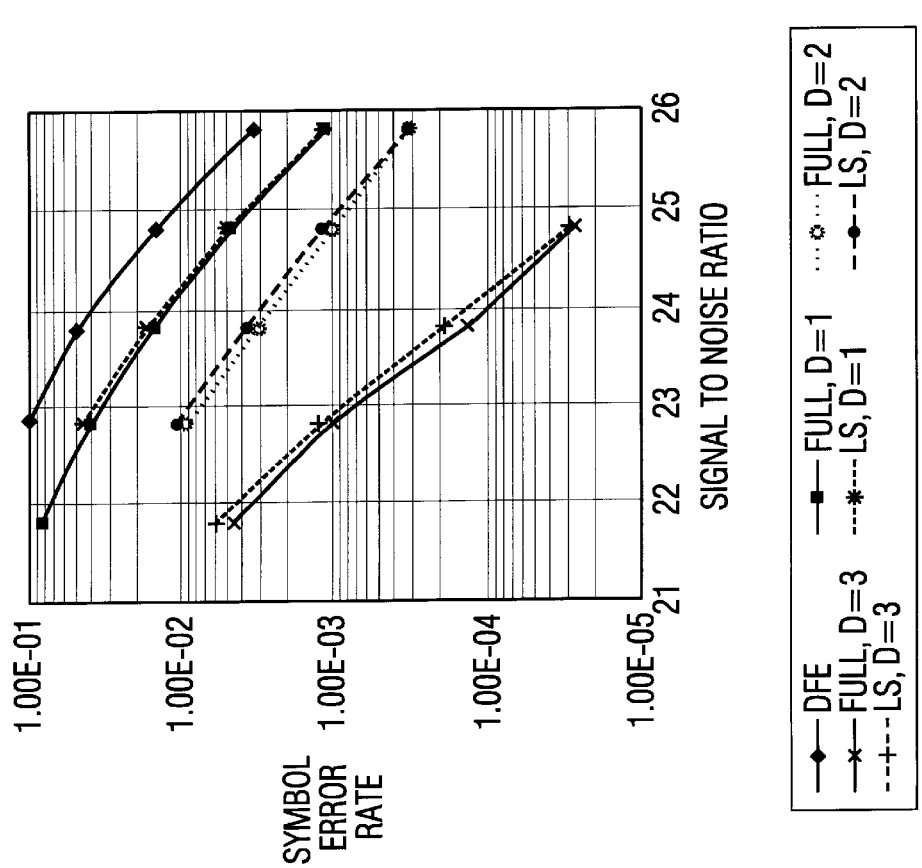

FIGS. 5 and 6 show the results of computer simulations for comparing the performance of the D+1 path search tree process according to the first embodiment of the invention to the FDTS on two of the channels described in the above-referenced Clark et al article. The first channel is the $(1+D)^2$ channel, normalized to unit energy. The second channel reported by Clark et al to be a minimum phase channel was obtained from a telephone line. The FIR coefficients are as follows: Channel 1: $h_0 = 0.408$, $h_1 = 0.816$, $h_2 = 0.408$; Channel 2: $h_0 = 0.548$, $h_1 = 0.789$, $h_2 = 0.273$, $h_3 = -0.044$, $h_4 = 0.027$. Both simulations used four level signaling, and the run length varied from $10^5$ to $10^8$ symbols, depending on the error rate.

As can be seen in FIGS. 5 and 6, the performance of a reduced (D+1) path tree search routine of the present invention is virtually indistinguishable from that of a full search FDTS. On channel 1, with D=3, the error rate for the limited search FDTS of the invention is approximately 30% higher than that of a full search FDTS, when operating at relatively high error rates (on the order of about $5 \times 10^{-3}$). However, the difference between the two drops to only about 5% when operating at a much smaller error rate on the order of $10^{-5}$. On channel 2, the difference is even smaller, usually in the 2–3% range. The results shown for the FDTS are consistent with those reported in the Clark et al article, where the parameter n is the same as D+1 in the reduced tree search of the present invention.

Figure 7:
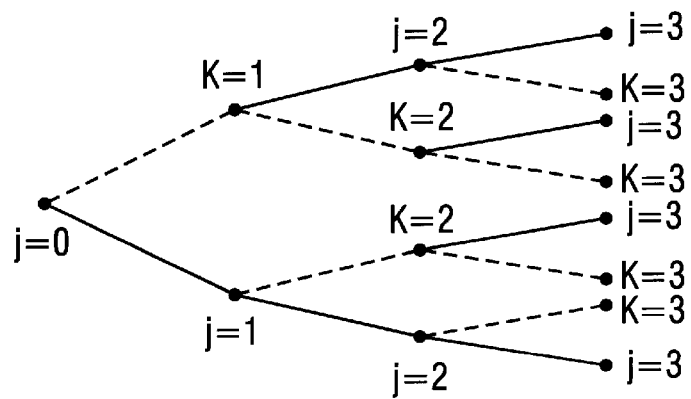
FIG. 7 diagrammatically illustrates a reduced fixed delay search tree in accordance with a second embodiment of the invention, having $2^{D+1}$ tentative decision paths.

According to a second embodiment of the invention, shown diagrammatically in FIG. 7, the FDTS is reduced to a search tree having $2^{D+1}$ paths, which are more than the D+1 paths of the first embodiment, but still less than the $M^{D+1}$ paths of a conventional FDTS. This alternative approach is similar to the first embodiment, in that it again determines an error metric of a received symbol value for each of M branches, extending from a jth node, where j has a value from 0 to D, starting with the input node as a first node and continuing through successive nodes. A smallest error metric is defined as that (j+1) th node to which a smallest error metric branch from the jth node extends. Also, a kth next smallest error metric node, where k has a value from j+1 to D, is defined as that kth node to which a next smallest error metric branch from a respective jth node extends. Similarly for each kth node a pair of smallest and next smallest error metrics are defined. Thus each jth or kth node has a pair of decision paths, one of which is associated with the smallest error metric and the other of which is associated with the next smallest error metric. What results is the reduced sized decision tree shown in FIG. 7, having $2^{D+1}$ tentative decision paths which extend from the input node through each of the jth and kth nodes. Advantageously, the tree can be extended after each decision by calculating only one new branch error metric.

Figure 8:
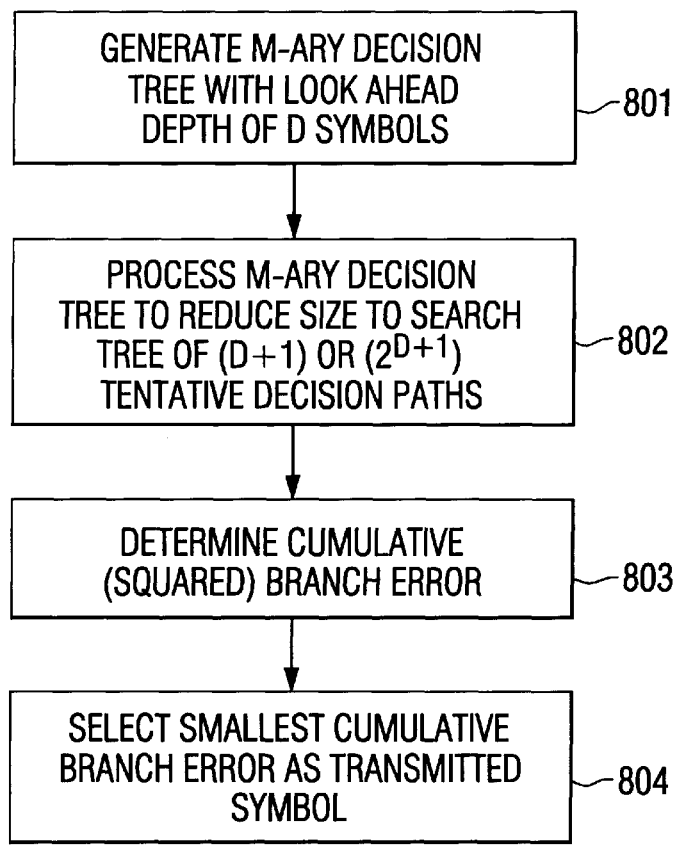
FIG. 8 is a process flow diagram of respective steps of the invention.
Figure 9:
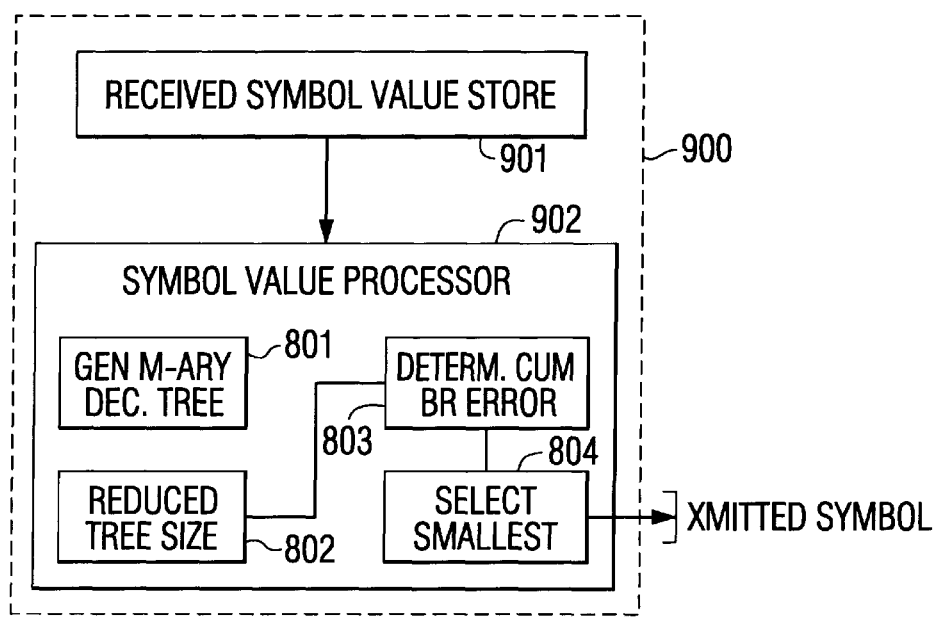
FIG. 9 diagrammatically illustrates a signal processing arrangement in which the process steps of FIG. 8 are executed.

FIGS. 8 and 9 respectively show the fundamental process of the present invention described above, and a signal processing arrangement for executing that process. In the signal processing arrangement 900 shown in FIG. 9, which is the inventive counterpart to the M-ary tree search processor 14 of FIG. 1, received symbol values are stored in a store 901 for subsequent processing by a symbol value processor 902.

At step 801, the symbol value processor generates an M-ary decision tree with a look-ahead depth of D symbols. Following this step, at step 802, the M-ary decision tree is processed to reduce the size of the search tree to a depth less than $M^{D+1}$, such as one having D+1 tentative decision paths of the first embodiment or $2^{D+1}$ has for the second embodiment. In step 803, the cumulative square branch error is determined. Then, in step 804, the smallest cumulative branch error is selected as the transmitted symbol value.

As will be appreciated from the foregoing description, the reduced search variant of an FDTS in accordance with the present invention significantly reduces the complexity of the path search through the FDTS for M-ary signaling. At each stage of the tree, the invention employs a modified DFE decision device (a slicer) to select both the minimum error metric path that would be chosen by the DFE, and a diverging path. Since the tree search may encompass either D+1 or $2^{D+1}$ levels, the invention reduces the number of paths to be searched from $M^{D+1}$ to D+1 or $2^{D+1}$. Both synchronous and asynchronous implementations may be used. Also, analysis and simulation (for an M=4ary signalling) results show that this approximation has little effect on the performance of the FDTS.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a communication system, in which M-ary communication signals are transmitted over a channel, which subjects said communication signals to interference, a method of processing received signals from said channel to derive estimates of symbols, each of which may be any one of M symbols, where M is greater than two, transmitted over said channel, comprising the steps of:

(a) generating an M-ary decision tree having a look-ahead depth of D symbols and M branches, respectively associated with each of said M symbols, sequentially extending from successive nodes of said tree, thereby realizing $M^{D+1}$ tentative decision paths through said M-ary decision tree;

(b) processing said M-ary decision tree using said received signals to reduce the size of said M-ary decision tree to a search tree having less than $M^{D+1}$ tentative decision paths;

(c) determining cumulative branch error for respective branches of each of the tentative decision paths of said search tree; and (d) selecting, as an actually transmitted symbol, that one of said M symbols associated with a selected node of the tentative decision path of said search having smallest cumulative branch error as determined in step (c).

2. A method according to claim 1, wherein said channel comprises a time-dispersive channel, which subjects said M-ary communication signals to intersymbol interference, and wherein said M-ary communication signals comprise HDSL (high speed digital subscriber) communication signals each symbol of which may be any of M=four symbols.

3. A method according to claim 1, wherein step (c) comprises determining squared branch error for respective branches of each of the tentative decision paths of said search tree, and wherein step (d) comprises selecting, as an actually transmitted symbol, that one of said M symbols associated with a most upstream node of the tentative decision path of said search tree having smallest cumulative squared branch error as determined in step (c).

4. A method according to claim 1, wherein step (b) comprises reducing the size of said M-ary decision tree from $M^{D+1}$ tentative decision paths to a search tree having D+1 tentative decision paths.

5. A method according to claim 4, wherein step (b) comprises:

(b1) beginning with an input node as a first node and continuing through D successive nodes, determining an error metric of a received symbol value for each of M branches extending from a jth node of said M-ary decision tree, and defining a smallest error metric node of said M-ary decision tree as that (j+1) th node to which a smallest error metric branch from said jth node extends, where j has a value from 0 to D;

(b2) for each jth smallest error metric node defined in step (b1), defining a kth next smallest error metric node of said M-ary decision tree as that kth node to which a next smallest error metric branch from a respective jth node extends, where k has a value from j+1 to D;

(b3) for each kth smallest error metric node defined in step (b2), determining an error metric of a received symbol value for each of M branches extending therefrom, and defining an lth auxiliary smallest error metric node of said M-ary decision tree as that node to which an auxiliary smallest error metric branch from a respective kth node extends, where l has a value from k+1 to D+1; and (b4) defining D+1 tentative decision paths of said search tree as a first path of said M-ary decision tree through each of said jth nodes, and D paths of said M-ary decision tree, each of which contains a next smallest error metric branch to a kth node from each of said jth nodes of primary path and auxiliary smallest error metric branches extending from said kth nodes through successive lth nodes.

6. A method according to claim 1, wherein step (b) comprises reducing the size of said M-ary decision tree from $M^{D+1}$ tentative decision paths to a search tree having $2^{D+1}$ tentative decision paths, by:

(b1) beginning with an input node as a first node and continuing through successive nodes, determining an error metric of a received symbol value for each of M branches extending from a jth node of said M-ary decision tree, and defining a smallest error metric node of said M-ary decision tree as that (j+1) th node to which a smallest error metric branch from said jth node extends, where j has a value from 0 to D, and defining a kth next smallest error metric node of said M-ary decision tree as that kth node to which a next smallest error metric branch from a respective jth node extends, where k has a value from j+1 to D; and (b2) defining tentative decision paths of said search tree from said input node through each of said jth and kth nodes.

7. A method according to claim 6, wherein step (c) comprises determining squared branch error for respective branches of each of the tentative decision paths of said search tree, and wherein step (d) comprises selecting, as an actually transmitted symbol, that one of said M symbols associated with a most upstream node of the tentative decision path of said search tree having smallest cumulative squared branch error as determined in step (c).

8. A signal processing arrangement for a communication system in which M-ary communication signals, wherein M is greater than two, are transmitted over a channel that subjects said communication signals to interference, said signal processing arrangement comprising:

a received symbol value store in which digitized samples of received signals from said channel are stored; and a symbol value processor to which said digitized samples of received signals are successively applied and being operative to generate estimates of actually transmitted symbols signals received from said channel, each estimate being any one of M symbols, by executing the following sequence of steps:

(a) generating an M-ary decision tree having a look-ahead depth of D symbols and M branches, respectively associated with each of said M symbols, sequentially extending from successive nodes of said tree, thereby realizing $M^{D+1}$ tentative decision paths through said M-ary decision tree;

(b) processing said M-ary decision tree using said received signals to reduce the size of said M-ary decision tree to a search tree having less than $M^{D+1}$ tentative decision paths;

(c) determining cumulative branch error for respective branches of each of the tentative decision paths of said search tree; and (d) selecting, as an actually transmitted symbol, that one of said M symbols associated with a selected node of the tentative decision path of said search having smallest cumulative branch error as determined in step (c).

9. A signal processing arrangement according to claim 8, wherein said channel comprises a time-dispersive channel, which subjects said M-ary communication signals to intersymbol interference, and wherein said M-ary communication signals comprise HDSL communication signals each symbol of which may be any of M=four symbols.

10. A signal processing arrangement according to claim 8, wherein step (c) comprises determining squared branch error for respective branches of each of the tentative decision paths of said search tree, and wherein step (d) comprises selecting, as an actually transmitted symbol, that one of said M symbols associated with a most upstream node of the tentative decision path of said search tree having smallest cumulative squared branch error as determined in step (c).

11. A signal processing arrangement according to claim 8, wherein step (b) comprises reducing the size of said M-ary decision tree from $M^{D+1}$ tentative decision paths to a search tree having D+1 tentative decision paths.

12. A signal processing arrangement according to claim 11, wherein step (b) comprises:

(b1) beginning with an input node as a first node and continuing through D successive nodes, determining an error metric of a received symbol value for each of M branches extending from a jth node of said M-ary decision tree, and defining a smallest error metric node of said M-ary decision tree as that (j+1) th node to which a smallest error metric branch from said jth node extends, where j has a value from 0 to D;

(b2) for each jth smallest error metric node defined in step (b1), defining a kth next smallest error metric node of said M-ary decision tree as that kth node to which a next smallest error metric branch from a respective jth node extends, where k has a value from j+1 to D;

(b3) for each kth smallest error metric node defined in step (b2), determining an error metric of a received symbol value for each of M branches extending therefrom, and defining an lth auxiliary smallest error metric node of said M-ary decision tree as that node to which an auxiliary smallest error metric branch from a respective kth node extends, where l has a value from k+1 to D+1; and (b4) defining D+1 tentative decision paths of said search tree as a first path of said M-ary decision tree through each of said jth nodes, and D paths of said M-ary decision tree, each of which contains a next smallest error metric branch to a kth node from each of said jth nodes of primary path and auxiliary smallest error metric branches extending from said kth nodes through successive lth nodes.

13. A signal processing arrangement according to claim 8, wherein step (b) comprises reducing the size of said M-ary decision tree from $M^{D+1}$ tentative decision paths to a search tree having $2^{D+1}$ tentative decision paths, by:

(b1) beginning with an input node as a first node and continuing through successive nodes, determining an error metric of a received symbol value for each of M branches extending from a jth node of said M-ary decision tree, and defining a smallest error metric node of said M-ary decision tree as that (j+1) th node to which a smallest error metric branch from said jth node extends, where j has a value from 0 to D, and defining a kth next smallest error metric node of said M-ary decision tree as that kth node to which a next smallest error metric branch from a respective jth node extends, where k has a value from j+1 to D; and (b2) defining tentative decision paths of said search tree from said input node through each of said jth and kth nodes.

14. A signal processing arrangement according to claim 13, wherein step (c) comprises determining squared branch error for respective branches of each of the tentative decision paths of said search tree, and wherein step (d) comprises selecting, as an actually transmitted symbol, that one of said M symbols associated with a most upstream node of the tentative decision path of said search tree having smallest cumulative squared branch error as determined in step (c).

* * * * *